United States Patent [19]

Hietala et al.

[11] Patent Number: 5,270,532
[45] Date of Patent: Dec. 14, 1993

[54] TRAVELING-WAVE PHOTODETECTOR

[75] Inventors: Vincent M. Hietala, Placitas; Gregory A. Vawter, Albuquerque, both of N. Mex.

[73] Assignee: The United States of America as represented by the United States Department of Energy, Washington, D.C.

[21] Appl. No.: 898,999

[22] Filed: Jun. 15, 1992

[51] Int. Cl.$^5$ ............................................. H01J 40/14
[52] U.S. Cl. ..................................... 250/214.1; 385/2
[58] Field of Search .................. 250/214.1, 214 LA; 385/2, 3, 4; 257/431, 458, 461

[56] References Cited

U.S. PATENT DOCUMENTS

| | | | |
|---|---|---|---|
| 3,229,106 | 1/1966 | Lord et al. | 250/217 |
| 3,358,245 | 12/1967 | Pigg | 332/31 |
| 3,430,061 | 2/1969 | Smith | 307/88.3 |
| 3,833,435 | 9/1974 | Logan et al. | 156/11 |
| 4,054,363 | 10/1977 | Suematsu | 350/96 |
| 4,137,543 | 1/1979 | Beneking | 357/30 |
| 4,360,246 | 11/1982 | Figueroa et al. | 350/96.12 |
| 4,517,581 | 5/1985 | Thompson | 357/30 |
| 4,970,566 | 11/1990 | Mendelhall | 357/30 |
| 5,047,623 | 9/1991 | Wilcox | 250/214.1 |

OTHER PUBLICATIONS

Taylor, H. F., et al., "Traveling Wave Photodetectors," Optoelectronic Signal Processing for Phased-Array Antennas II (1990) pp. 59–63.

*Primary Examiner*—David C. Nelms
*Attorney, Agent, or Firm*—Karuna Ojanen; James H. Chafin; William R. Moser

[57] ABSTRACT

The traveling-wave photodetector of the present invention combines an absorptive optical waveguide and an electrical transmission line, in which optical absorption in the waveguide results in a photocurrent at the electrodes of the electrical transmission line. The optical waveguide and electrical transmission line of the electrically distributed traveling-wave photodetector are designed to achieve matched velocities between the light in the optical waveguide and electrical signal generated on the transmission line. This velocity synchronization provides the traveling-wave photodetector with a large electrical bandwidth and a high quantum efficiency, because of the effective extended volume for optical absorption. The traveling-wave photodetector also provides large power dissipation, because of its large physical size.

34 Claims, 4 Drawing Sheets

TRAVELING-WAVE PHOTODETECTOR

STATEMENT REGARDING FEDERALLY SPONSORED RESEARCH

The U.S. Government has rights in this invention as provided for by the terms of contract No. DE-AC04-76DP00789 awarded by the United States, Department of Energy to American Telephone and Telegraph Company.

BACKGROUND OF THE INVENTION

Field of the Invention

The field of this invention relates to solid state photodetectors, and in particular, a traveling-wave photodetector having an electrically distributed electrode structure.

Photodetectors convert modulated light into electrical signals. Most solid-state photodetectors operate by incident light or photons being absorbed to "create" carriers, that is, electrons and holes. In photoconductors, these carriers change the conductivity of the devices. In devices such as PIN diodes and avalanche photodiodes (APDs), the carriers are swept away to electrical contacts to produce a photocurrent. In either case, a detectable electrical change occurs and light detection is achieved.

A PIN diode is formed when p-type and n-type semiconductor regions are separated by a layer of intrinsic semiconductor material. Intrinsic semiconductor material ideally is pure semiconductor material with no doping, but in reality is semiconductor material that is slightly doped ($<10^{14}$ atoms/cm$^3$).

One measure of the quality of the conversion of light to electrical signal within a photodetector is the quantum efficiency. The quantum efficiency is the ratio of carriers generated to incident photons. That is, if for every photon incident on the device one electron-hole pair is generated, the detector is said to have a quantum efficiency of 100%. Low-bandwidth photodetectors with quantum efficiencies as high as 80% are not uncommon.

Traditional photodetectors are electrically lumped devices. That is, they can be considered to exist at one point in space where all of the photocurrent generation takes place. This means that the bandwidth of traditional photodetectors is generally limited by the resistance and capacitance of the detector. That is, the bandwidth of the photodetector is simply $f_{-3dB} = \frac{1}{2}\pi RC$, where C is the capacitance of the detector and R is the Thevenin equivalent resistance that the detector drives. In order to increase the bandwidth of traditional photodetectors, the RC product must be decreased. Since R is generally fixed by the external circuit driven by the photodetector, the only way to improve bandwidth is to decrease the capacitance C.

The capacitance C is easily decreased by either reducing the surface area or by increasing the electrode spacing of the device. To reduce the surface area, the device must be made smaller. To increase the electrode spacing, the depletion layer in the device must be made thicker. Unfortunately, these changes reduce both the quantum efficiency and power dissipation capabilities of the photodetector.

If the surface area is decreased, the quantum efficiency is reduced because of the practical difficulty in getting all of the light to be absorbed within the small detector. Additionally, an increase in electrode spacing introduces a transit-time frequency response limitation which reduces effective quantum efficiency at high frequencies. In general, increasing the electrical bandwidth yields a reduction in quantum efficiency. Furthermore, the maximum power dissipation of the detector also reduces with decreased detector size.

SUMMARY OF THE INVENTION

The traveling-wave photodetector of the present invention combines an absorptive optical waveguide and an electrical transmission line, in which optical absorption in the waveguide results in a photocurrent at the electrodes of the electrical transmission line. The optical waveguide and electrical transmission line of the electrically distributed traveling-wave photodetector are designed to achieve matched velocities between the light in the optical waveguide and electrical signal generated on the transmission line. This velocity synchronization provides the traveling-wave photodetector with a large electrical bandwidth and a high quantum efficiency, resulting from the effective extended volume for optical absorption. The traveling-wave photodetector also provides large power dissipation because of its large physical size.

DETAILED DESCRIPTION OF THE INVENTION

Figure 1:
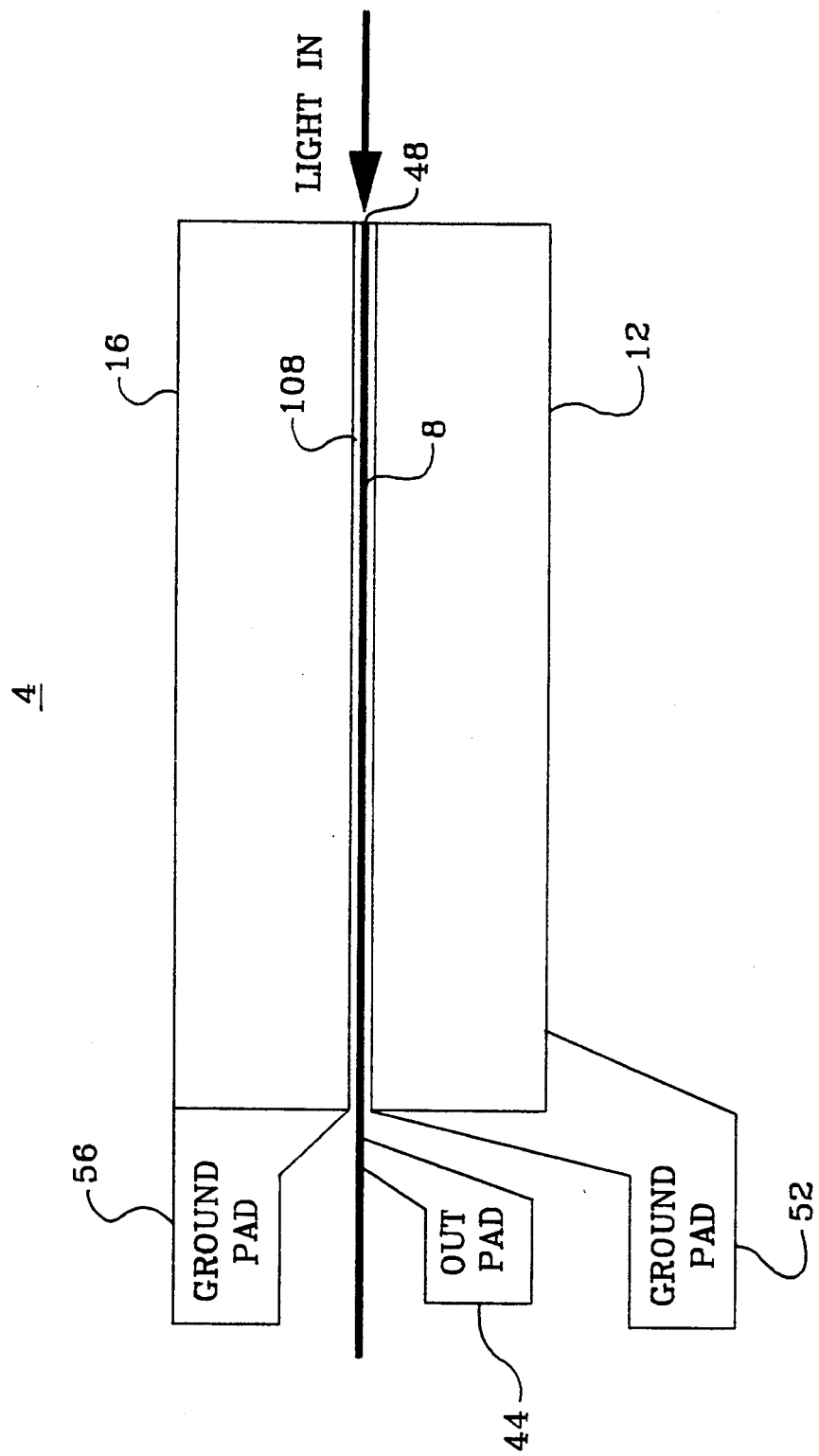
FIG. 1 shows a schematic plan view of the traveling-wave photodetector of the present invention.
Figure 2:
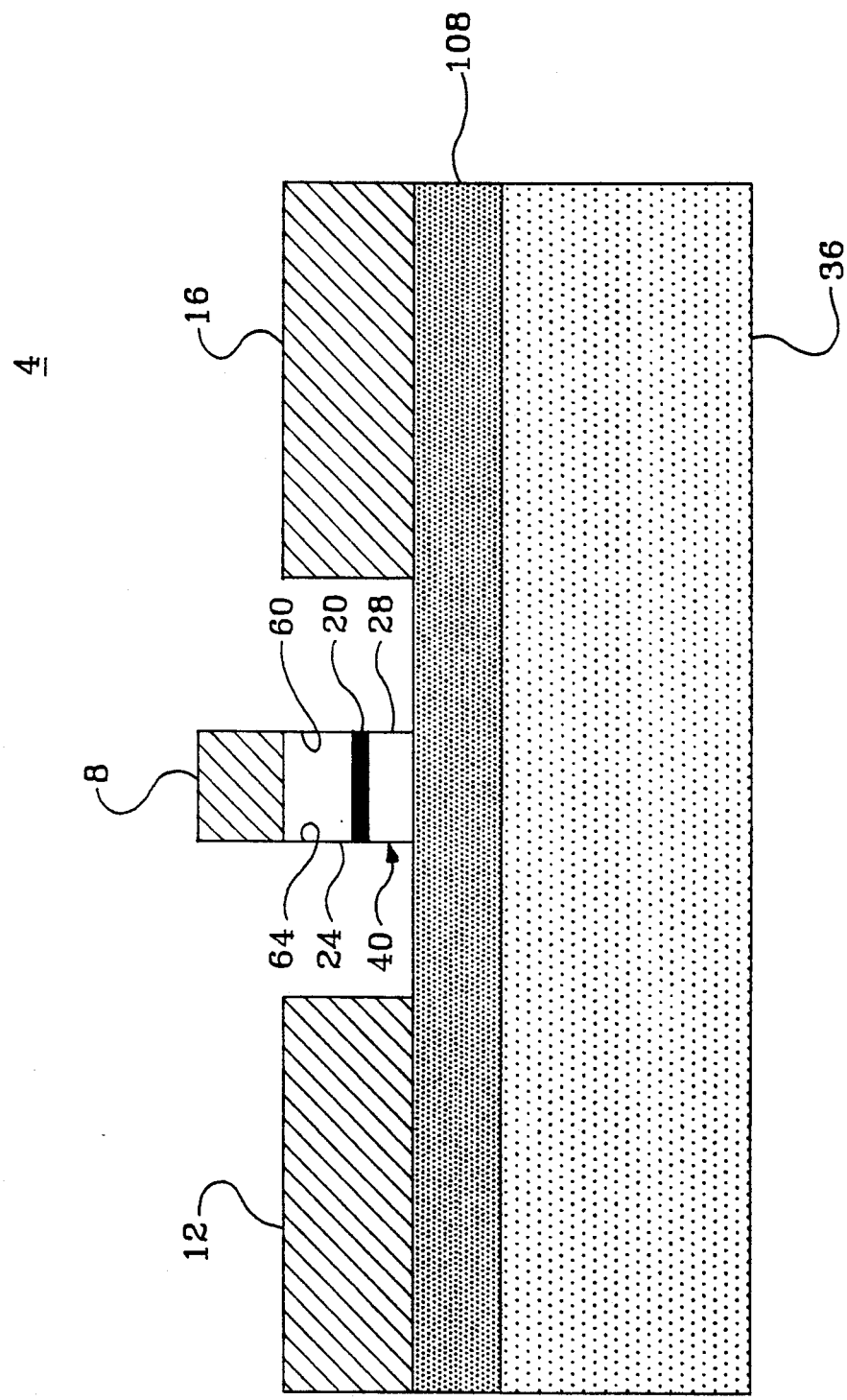
FIG. 2 shows a schematic cross-section of a portion of the traveling-wave photodetector of FIG. 1.

Referring to FIGS. 1, 2, there are shown a schematic plan view and a schematic cross-section of a portion of traveling-wave photodetector 4 of the present invention. Photodetector 4 comprises metal center electrode 8, metal ground electrodes 12, 16, waveguide 40, lossy conductor layer 108, substrate 36, ground connector pads 52, 56, and output connector pad 44. Waveguide 40 is formed of absorbing waveguide layer 20 sandwiched between upper cladding layer 24 and lower cladding layer 28.

Output connector pad 44 of photodetector 4 is in electrical contact with center electrode 8. Center electrode 8 is also in electrical contact with upper cladding layer 24, which is also in electrical contact with waveguide layer 20. Waveguide layer 20 is also in electrical contact with lower cladding layer 28, which is itself also in electrical contact with lossy conductor layer 108. Lossy conductor layer 108 is also in electrical contact with ground electrodes 12, 16, which are also in electrical contact with ground connector pads 52, 56, respectively.

Electric leads (not shown) are attached to output connector pad 44 and to ground connector pads 52, 56, and an electrical bias is thereby applied between center electrode 8 and ground electrodes 12, 16. When light is incident on end 48 of photodetector 4, light travels within waveguide 40 away from end 48 and is absorbed within waveguide layer 20, creating carrier pairs. Each carrier pair consists of an electron and a hole.

When the bias applied between center electrode 8 and ground electrodes 12, 16 is negative, the holes generated within waveguide layer 20 travel from waveguide layer 20 through upper cladding layer 24 to center electrode 8. Simultaneously, the electrons generated within waveguide layer 20 travel from waveguide layer 20 through lower cladding layer 28 then through lossy conductor layer 108 to ground electrodes 12, 16.

The electrical signal, generated by these holes and electrons, travels along center electrode 8 and ground electrodes 12, 16 away from end 48 of photodetector 4 and is detected at output connector pad 44. The velocity of the electrical signal traveling along photodetector 4 substantially equals the velocity of the propagation of light within waveguide layer 20.

Photodetector 4 is made physically large by controlling the optical absorption in waveguide layer 20 and by designing electrodes 8, 12, 16 for velocity synchronism with the light. Light is launched into waveguide layer 20 of waveguide 40 at end 48. Use of a thin absorbing layer ($\approx 120$ Å) within the waveguide layer 20 permits a very large absorption area. This large area results in high quantum efficiency and high power dissipation. Light is "detected" in the extended absorption region within waveguide layer 20 along waveguide 40, yielding distributed current generation along the length of photodetector 4.

Metal electrodes 8, 12, 16 are designed to allow for this generated radio frequency (RF) signal current to "travel" in synchronism with the light. Hence the name traveling-wave photodetector. With the achievement of velocity synchronism, the photo-generated distributed current adds at output connector pad 44 of photodetector 4.

Figure 3:
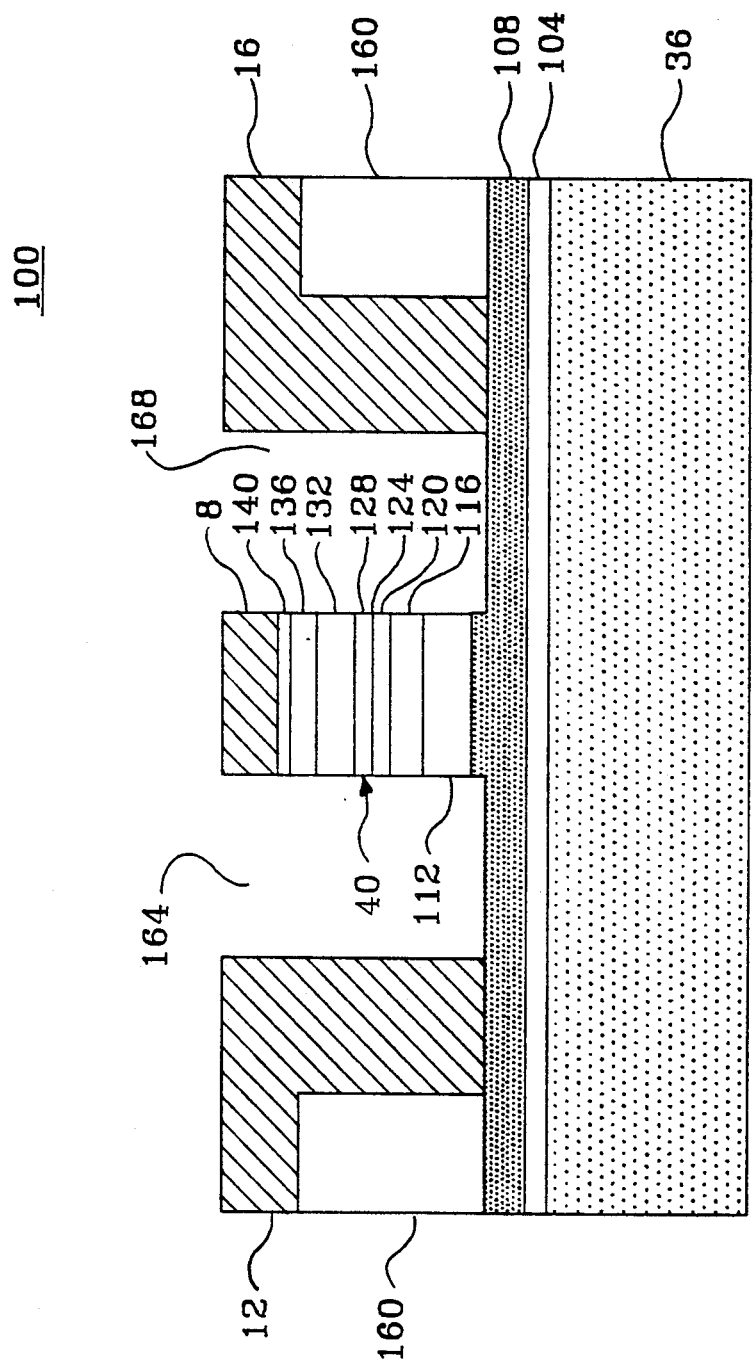
FIG. 3 shows a detailed schematic cross-section of a preferred embodiment of the traveling-wave photodetector of the present invention; and, FIG. 4 shows a schematic block diagram of an application of the traveling-wave photodetector of the present invention in an optical heterodyne RF generator.

Waveguide layer 20, the center of waveguide 40, is fabricated of a material with higher optical index than the material used in upper and lower cladding layers 24, 28 to confine the light within waveguide layer 20. In photodetector 4, waveguide layer 20 is made of aluminum gallium arsenide (Al$_Y$Ga$_{1-Y}$As) and cladding layers 24, 28 are made of aluminum gallium arsenide (Al$_X$Ga$_{1-X}$As) where X>Y. The mole fraction X and Y need not be constant in the waveguide and cladding layers but the highest mole fraction Y in the waveguide layer should be lower than the lowest mole fraction X of the cladding. There is a thin absorbing layer 124 made of In$_Z$Ga$_{1-Z}$As placed within the waveguide layer, as shown in FIG. 3. Referring back to FIG. 2, the light is laterally confined by walls 60, 64 of rib-shaped waveguide 40, thereby completing the formation of an optical waveguide in the center of waveguide 40.

Waveguide 40 is designed to achieve appropriate absorption and propagation velocity. The absorption is adjusted by varying the thickness of thin InGaAs absorbing layer 124 as shown in FIG. 3. The absorption is selected to be high enough for the majority (approximately 99%) of the light to be absorbed for high quantum efficiency, while still being low enough to allow for a large device area to achieve high power dissipation. The propagation velocity of light is selected by the dimensions and material compositions of to waveguide 40.

The actual light velocity achieved within photodetector 4 is not critical, since the RF propagation velocity can be varied over a large range for synchronism. Additionally, the velocity synchronism condition is of low sensitivity to device performance. The metal electrode structure, comprised of rib-shaped center electrode 8 on top of the waveguide 40 and planar ground electrodes 12, 16 to either side along with "buried" heavily doped n$^+$-type lossy conductor layer 108, forms a slow-wave coplanar transmission line. The propagation velocity of this transmission line is tunable over a large range by varying the dimensions of the line. Hence, velocity synchronism is achieved.

Referring now to FIG. 3, there is shown a detailed schematic cross-section of traveling-wave photodetector 100 of the present invention. Those skilled in the art will recognize that traveling-wave photodetector 100 is a preferred embodiment of traveling-wave photodetector 4 of the present invention. Photodetector 100 is chiefly comprised of substrate 36, lossy conductor layer 108, waveguide 40, center electrode 8, and ground electrodes 12, 16. Photodetector 100 is made by successively growing or applying layers of various materials on substrate 36 and selectively removing sections of those layers. These steps of growing, applying, and removing layers are performed using conventional semiconductor fabrication techniques.

Substrate 36, which provides support for photodetector 100, is a layer of semi-insulating (S.I.) gallium arsenide (GaAs) with a thickness of approximately 500 $\mu$m. S.I. GaAs is selected to reduce the loss of the RF signal power generated within photodetector 100.

Fabrication of photodetector 100 begins by growing semiconductor layers 104–140 on substrate 36. Table I presents a top-down description of the example thicknesses and example compositions of semiconductor layers 104–140 of photodetector 100. It will be understood by those skilled in the art that the present invention is not limited to the exact thicknesses and compositions presented in Table 1. Traveling-wave photodetectors having compositions different from that of photodetector 100 are within the scope of the present invention.

The first layer grown on substrate 36 of photodetector 100 is intrinsic buffer layer 104, a GaAs layer approximately 2000 Å thick. On top of intrinsic buffer layer 104 is grown n$^+$-type lossy conductor layer 108, a layer of GaAs approximately 5000 Å thick and heavily doped with silicon (Si) at approximately $2.0 \times 10^{18}$ atoms/cm$^3$.

TABLE I

| Semiconductor Layers of Photodetector 4. | | | | | |
|---|---|---|---|---|---|
| Layer | Thick | Material | Dop | Type | Level |
| p-type cap 140 | 1000 Å | GaAs | Be | p$^+$ | $1 \times 10^{19}$ |
| p-type cladding 136 | 6000 Å | Al$_X$Ga$_{1-X}$As | Be | p | $5 \times 10^{17}$ |
| intrinsic cladding 132 | 4000 Å | Al$_X$Ga$_{1-X}$As | UN | | |
| intrinsic graded 128 | 2000 Å | Al$_Y$Ga$_{1-Y}$As | UN | | |
| quantum well 124 | 120 Å | In$_Z$Ga$_{1-Z}$As | UN | | |
| intrinsic graded 120 | 2000 Å | Al$_Y$Ga$_{1-Y}$As | UN | | |
| intrinsic cladding 116 | 4000 Å | Al$_X$Ga$_{1-X}$As | UN | | |
| n-type cladding 112 | 6000 Å | Al$_X$Ga$_{1-X}$As | Si | n | $5 \times 10^{17}$ |
| n-type lossy 108 | 5000 Å | GaAs | Si | n$^+$ | $2 \times 10^{18}$ |
| intrinsic buffer 104 | 2000 Å | GaAs | UN | | |

The next layer grown is n-type lower cladding layer 112, approximately 6000 Å of aluminum gallium arsenide (Al$_X$Ga$_{1-X}$As) moderately doped with Si at approximately $5.0 \times 10^{17}$ atoms/cm$^3$. Next comes intrinsic lower cladding layer 116, a layer of intrinsic Al$_X$Ga$_{1-X}$As approximately 4000 Å thick. In both n-type lower cladding layer 112 and intrinsic lower cladding layer 116, the concentration of aluminum (Al) is 60%; that is, X is 0.6.

Intrinsic lower graded layer 120 is then grown on top of intrinsic lower cladding layer 116. Intrinsic lower graded layer 120 is 2000 Å of intrinsic Al$_Y$Ga$_{1-Y}$As. The term "graded" in "intrinsic lower graded layer 120" refers to the linear variation in the concentration of Al from Y=0.6 to Y=0.2 as layer 120 is grown. Next comes quantum well layer 124, a 100 Å layer of intrinsic indium gallium arsenide (In$_Z$Ga$_{1-Z}$As). The selection of InGaAs with Z=0.3 for quantum well layer 124 makes photodetector 100 suitable for detector operation at 1.06 μm light.

On top of quantum well layer 124 is grown intrinsic upper graded layer 128, a 2000 Å layer of intrinsic Al$_Y$Ga$_{1-Y}$As in which the concentration of Al varies linearly from Y=0.2 to Y=0.6 as layer 128 is grown. Layers 120, 124, and 128 comprise the waveguide layer 20 of FIG. 2. Next comes intrinsic upper cladding layer 132, a layer of intrinsic Al$_X$Ga$_{1-X}$As with a thickness of 4000 Å and an Al concentration of X=0.6. Layer 132 is followed by p-type upper cladding layer 136, 6000 Å of Al$_X$Ga$_{1-X}$As moderately doped with beryllium (Be) at approximately $5.0 \times 10^{17}$ atoms/cm$^3$. In layer 132, the aluminum concentration X is 0.6.

The last semiconductor layer grown on photodetector 100 is p+-type cap layer 140, 1000 Å of GaAs heavily doped with Be at approximately $1.0 \times 10^{19}$ atoms/cm$^3$. Cap layer 140 allows for ohmic contact with center electrode 8.

Those skilled in the art will realize that the configuration of layer materials and thicknesses of photodetector 100 is selected to allow the depletion layer of the junction of waveguide 40 to be more controllable with its edges designed to be approximately at the top and bottom edges of moderately doped cladding layers 112, 136, respectively. This configuration results in low carrier transit times.

After growing semiconductor layers 104-140, selected portions of layers 112-140 are removed by conventional semiconductor fabrication techniques such as chemical etching to yield rib-shaped waveguide 40. Waveguide 40 is a long thin rib approximately 3 μm wide.

Those skilled in the art will recognize that absorbing waveguide layer 20 of photodetector 4 is substantially equivalent to that part of photodetector 100 comprised of intrinsic upper graded layer 128, quantum well layer 124, and intrinsic lower graded layer 120. Similarly, upper cladding layer 24 of photodetector 4 is substantially equivalent to that part of photodetector 100 comprised of p-type upper cladding layer 136 and intrinsic upper cladding layer 132. Furthermore, lower cladding layer 28 of photodetector 4 is substantially equivalent to that part of photodetector 100 comprised of intrinsic lower cladding layer 116 and n-type lower cladding layer 112.

After forming waveguide 40, polyimide layer 160 is selectively applied to exposed portions of n-type lossy conductor layer 108. Polyimide layer 160 is added as a fabrication convenience and is not intended to affect the optical or RF performance of photodetector 100.

Following application of polyimide layer 160, center electrode 8 and ground electrodes 12, 16 are applied. Center electrode 8 is applied on top of p-type cap layer 140 of waveguide 40. Ground electrodes 12, 16 are selectively applied to polyimide layer 160 and exposed portions of n-type lossy conductor layer 108 to leave gaps 164, 168 of approximately 3 μm between rib waveguide 40 and planar ground electrodes 12, 16, respectively.

In photodetector 100, center electrode 8 and ground electrodes 12, 16 are made of electroplated gold approximately 3 μm thick. Titanium gold (Ti:Au) is used for ohmic contact between center electrode 8 and p-type cap layer 140. Similarly, germanium nickel gold (Ge:Ni:Au) is used for ohmic contact between ground electrodes 12, 16 and n+-type lossy conductor layer 108.

It will be understood by those skilled in the art that electrodes 8, 12, 16 and their ohmic contacts may be made of other suitable materials. For example, ohmic contact between center electrode 8 and p-type cap layer 140 may be provided by beryllium gold (Be:Au), titanium gold (Ti:Au), titanium platinum gold (Ti:Pt:Au), or gold zinc (Au:Zn). Similarly, ohmic contact between ground electrodes 12, 16 and n+-type lossy conductor layer 108 may be provided by germanium nickel gold (Ge:Ni:Au), chromium gold (Cr:Au), germanium gold silver gold (Ge:Au:Ag:Au), germanium molybdenum tungsten gold (Ge:Mo:W:Au), or germanium palladium tungsten gold (Ge:Pd:W:Au). Use of semiconductor materials other than GaAs for cap layer 140 and lossy conductor layer 108 could require selection of other alloys for ohmic contact.

Photodetector 100 has a high quantum efficiency and a large maximum power dissipation due to its large size. Additionally, its bandwidth is primarily determined by the electrical bandwidth of electrodes 8, 12, 16. The electrode structure formed by electrodes 8, 12, 16 is a slow-wave coplanar transmission line, with useful operation demonstrated to 40 GHz.

For proper operation of photodetector 100, two conditions must be satisfied: (1) the skin depth must be much greater that the thickness of lossy conductor layer 108, and (2) the time constant of the transmission line of photodetector 100 must be much smaller than the period of the operating frequency. Condition (1) may be represented algebraically as:

$$\delta = \frac{1}{\sqrt{\pi f \mu \sigma}} >> d,$$

where:
 δ is the skin depth, that is, the distance the magnetic field can extend into semiconductor layer 108,
 f is the operating frequency of photodetector 100,
 μ is the magnetic permeability of semiconductor layers 108,
 σ is the conductivity of lossy conductor layer 108, and
 d is the thickness of layer 108.

Since the conductivity σ of layer 108 is directly proportional to the level of doping in layer 108, Condition (1) establishes an upper bound on that doping level.

Condition (2) may be represented algebraically as:

$$RC << \frac{1}{2\pi f},$$

where:

R is the transverse resistance of lossy conductor layer 108 per unit length,

C is the capacitance per unit length of the transmission line of photodetector 100, RC is the time constant of the transmission line, and f is the operating frequency of photodetector 100.

The capacitance C depends on the physical structure of the transmission line and the transverse resistance R is approximated algebraically by:

$$R \approx \frac{1}{\sigma d},$$

where:

is the effective distance the current flows from center electrode 8 through lossy conductor layer 108, and σ and d are as before.

Given the direct relationship between the conductivity σ and the doping level of layer 108, Condition (2) places a minimum on that doping level for a given operating frequency. In combination, therefore, Conditions (1) and (2) establish a range of doping levels for lossy conductor layer 108 that will permit slow-wave propagation and hence proper operation of photodetector 100.

Once the conditions for slow-wave propagation are satisfied, the velocity and characteristic impedance of electrode structure 8, 12, 16 can be selected for proper operation. The condition for velocity match is simply:

$$\frac{c}{N_o} \approx \frac{1}{\sqrt{LC}}$$

where lower case c is the speed of light, $N_o$ is the optic index of the waveguide, L is the inductance per unit length of the electrode structure 8, 12, 16, and C is as defined before. The characteristic impedance is approximately:

$$Z_o = \sqrt{\frac{L}{C}}$$

where $Z_o$ is the characteristic impedance, and L and C are as defined before. The desired impedance for $Z_o$ is generally selected to match the load impedance being driven by the detector (maximum power transfer). The detector's physical dimensions of electrodes and pin junction depletion width are selected to match the velocities and adjust the characteristic impedance appropriately.

Those skilled in the art will recognize that selection of materials other than InGaAs for quantum well layer 124 will result in photodetectors suitable for detection of light at wavelengths other than 1060 nm. Table II presents a partial list of materials that may be used in quantum well layer 124 in lieu of InGaAs and the corresponding resultant wavelength ranges of those photodetectors. Those skilled in the art will understand that this list is merely representative and not exhaustive of the materials potentially ussable in photodetectors of the present invention. It will also be understood by those skilled in the art that changes in the composition of quantum well layer 124 may necessitate changes in the dimensions of electrodes 8, 12, 16 to achieve the desired velocity synchronism.

TABLE II

| Possible Materials for Quantum Well Layer 124. | |
|---|---|
| Material System | Approximate Wavelength Range |
| GaAlAs | 780–860 nm |
| InP/InAsP | 1060–3000 nm |
| AlGaAs/InGaAs | 900–1060 nm |
| InGaAsP | 1060–1600 nm |
| InSb/InAsSb | 6500–12000 nm |

Figure 4:
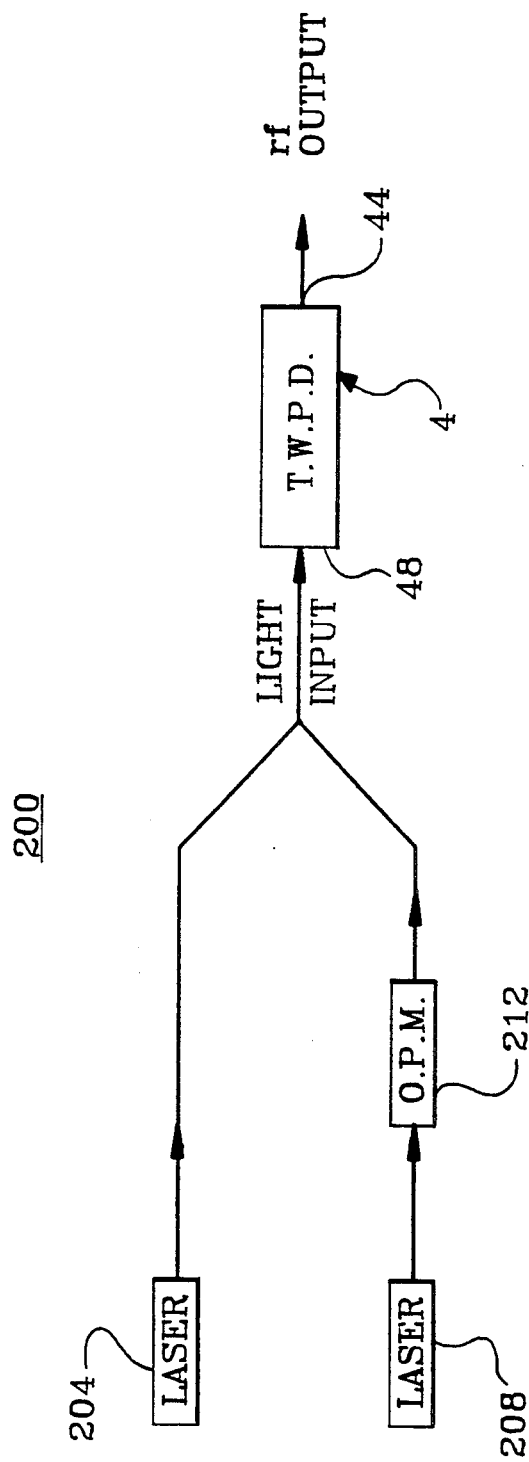

Referring now to FIG. 4, there is shown a schematic block diagram of the application of traveling-wave photodetector 4 of the present invention in optical heterodyne RF generator 200. Generator 200 consists of 1.06 μm lasers 204, 208, optical phase modulator 212, and traveling-wave photodetector 4. Light from laser 208 is modulated by optical phase modulator 212. The modulated light output from optical phase modulator 212 is then combined with light from laser 204. Lasers 208 and 204 are operated at a frequency difference equal to the output RF frequency. The combined light is then directed upon edge 48 of traveling-wave photodetector 100. Traveling-wave photodetector 4 converts the incident combined light into an RF signal detected at output connector pad 44 of photodetector 4. Optical phase modulator 212 provides a means of phase modulating the output RF signal.

It will be understood that various changes in the details, materials, and arrangements of the parts which have been described and illustrated in order to explain the nature of the present invention may be made by those skilled in the art without departing from the principle and scope of the present invention as expressed in the following claims.

What is claimed is:

1. A method of detecting light incident upon an electrically distributed traveling-wave photodetector, comprising the steps of:
   (a) receiving said light at said photodetector;
   (b) propagating said received light at a first velocity within said photodetector;
   (c) absorbing said received light within an optically thin absorbing layer whose thickness adjusts an interaction length of said light and an electrical signal;
   (d) generating said electrical signal in response to said absorbed light; and,
   (e) propagating said electrical signal at a second variable velocity within a slow wave coplanar transmission line; and
   (f) tuning an electrical bias so that said second velocity is substantially equal to said first velocity.

2. The method of claim 1, comprising the further step of transmitting said electrical signal away from said photodetector.

3. An electrically distributed, traveling-wave photodetector, comprising:
   (a) light propagation means for receiving and propagating light at a first velocity, said light propagation means further comprising a light absorbing means being adapted to absorb said light within an optically thin absorbing layer whose thickness adjusts the interaction length of said light and an electrical signal generated in response to said absorbed light; and
   (b) electrical signal propagation means, in electrical contact with said light propagation means, for propagating said electrical signal at a variable second velocity in a slow wave coplanar transmission line, wherein said second velocity can be tuned in response to an applied bias to be substantially equal to said first velocity.

4. The photodetector of claim 2, wherein said light propagation means comprises a semiconductor optical waveguide.

5. The photodetector of claim 4, wherein said semiconductor optical waveguide comprises:
  (a) an intrinsic semiconductor region;
  (b) a p-type semiconductor region, abutting a first surface of said intrinsic semiconductor region; and,
  (c) an n-type semiconductor region, abutting a second surface of said intrinsic semiconductor layer, wherein said second surface of said intrinsic semiconductor layer is opposite said first surface of said intrinsic semiconductor layer.

6. The photodetector of claim 5, wherein said intrinsic semiconductor region has an average optical index higher than the optical indices of said p-type and n-type semiconductor regions.

7. The photodetector of claim 5, wherein said intrinsic semiconductor region comprises:
  (a) said thin absorbing layer as a quantum well layer;
  (b) a first region of $Al_xGa_{1-x}As$, abutting a first surface of said quantum well layer; and,
  (c) a second region of $Al_xGa_{1-x}As$, abutting a second surface of said quantum well layer, wherein said second surface of said quantum well layer is opposite said first surface of said quantum well layer.

8. The photodetector of claim 7, wherein said quantum well layer is comprised of InGaAs.

9. The photodetector of claim 7, wherein said quantum well layer is comprised of GaAs.

10. The photodetector of claim 7, wherein x varies from approximately 0.2 to approximately 0.6 throughout said first and second regions of $Al_xGa_{1-x}As$.

11. The photodetector of claim 5, wherein said p-type semiconductor region is comprised of moderately doped $Al_xGa_{1-x}As$.

12. The photodetector of claim 11, wherein x is approximately 0.6.

13. The photodetector of claim 5, wherein said n-type semiconductor region is comprised of moderately doped $Al_xGa_{1-x}As$.

14. The photodetector of claim 13, wherein x is approximately 0.6.

15. The photodetector of claim 3, wherein said slow wave coplanar transmission line comprises:
  (a) a center electrode, abutting and in electrical contact with said light propagation means;
  (b) lossy conductor means, abutting said light propagation means, for receiving said electrical signal from said light absorbing means; and,
  (c) a ground electrode, abutting and in electrical contact with said lossy conductor means, physically separated from said light propagation means.

16. The photodetector of claim 15, wherein said center electrode is comprised of metal.

17. The photodetector of claim 15, wherein said lossy conductor means is comprised of heavily doped semiconductor material.

18. The photodetector of claim 17, wherein said semiconductor material is comprised of GaAs.

19. The photodetector of claim 17, wherein said semiconductor material is doped with silicon.

20. The photodetector of claim 15, wherein said ground electrode is comprised of metal.

21. A device for generating an electromagnetic signal, comprising:
  (a) means for coherent light and modulated coherent light in a combined beam of light; and
  (b) a traveling-wave photodetector having an electrical bias, wherein said combined beam of light is incident upon the surface of said traveling-wave photodetector having a thin absorbing layer whose thickness adjusts the interaction length of said combined beam and said electromagnetic signal and wherein said electromagnetic signal is generated and propagated in a slow wave coplanar transmission line such that tuning said electrical bias adjusts a velocity of said electromagnetic signal to be substantially the same as a velocity of said combined light beam within said traveling-wave photodetector.

22. The device of claim 21, further comprising means for generating said coherent light.

23. The device of claim 22, wherein said means for generating said coherent light comprises a laser.

24. The device of claim 21, further comprising means for generating said modulated coherent light.

25. The device of claim 24, wherein said means for generating said modulated coherent light comprises a second laser.

26. The device of claim 21, wherein said electromagnetic signal comprises an RF signal.

27. The device of claim 26, wherein said RF signal comprises a high-power RF signal.

28. The device of claim 21, further comprising means for transmitting said electromagnetic signal generated within said traveling-wave detector.

29. An electrically distributed, traveling-wave photodetector, comprising:
  (a) light propagation means for receiving and propagating light at a first velocity;
  (b) said light propagation means being adapted to absorb said light and generate an electrical signal in response to said absorbed light; and
  (c) electrical signal propagation means comprising a center electrode, abutting and in electrical contact with said light propagation means, a lossy conductor means, abutting and in electrical contact with said light propagation means, for receiving said electrical signal from said light propagation means, and a ground electrode, abutting and in electrical contact with said lossy conductor means, physically separated from said light propagation means, in electrical contact with said light propagation means, for propagating said electrical signal at a second velocity, wherein said second velocity is substantially equal to said first velocity.

30. The photodetector of claim 29, wherein said center electrode is comprised of gold.

31. The photodetector of claim 29, wherein said lossy conductor means is comprised of heavily doped n-type semiconductor material.

32. The photodetector of claim 31, wherein said semiconductor material is comprised of GaAs.

33. The photodetector of claim 31, wherein said semiconductor material is doped with silicon.

34. The photodetector of claim 29, wherein said ground electrode is comprised of gold.

* * * * *